US008527312B2

(12) United States Patent
Taix et al.

(10) Patent No.: US 8,527,312 B2
(45) Date of Patent: Sep. 3, 2013

(54) SYSTEM AND METHODS FOR MANAGING DYNAMIC TEAMS

(75) Inventors: Ron Taix, Laguna Niguel, CA (US); Frank McAninch, Huntington Beach, CA (US)

(73) Assignee: Orbidyne, Inc., Laguna Niguel, CA (US)

( * ) Notice: Subject to any disclaimer, the term of this patent is extended or adjusted under 35 U.S.C. 154(b) by 0 days.

(21) Appl. No.: 13/482,325

(22) Filed: May 29, 2012

(65) Prior Publication Data

US 2012/0239454 A1 Sep. 20, 2012

Related U.S. Application Data

(63) Continuation-in-part of application No. 11/875,639, filed on Oct. 19, 2007, now Pat. No. 8,195,488.

(60) Provisional application No. 60/862,387, filed on Oct. 20, 2006.

(51) Int. Cl.
*G06Q 10/00* (2012.01)
(52) U.S. Cl.
USPC ....... 705/7.11; 705/7.13; 705/7.14; 705/7.15; 705/7.16; 705/7.21; 705/7.26
(58) Field of Classification Search
USPC .............................. 705/7.13–7.16, 7.21, 7.26
See application file for complete search history.

(56) References Cited

U.S. PATENT DOCUMENTS

| | | | | |
|---|---|---|---|---|
| 6,073,109 | A * | 6/2000 | Flores et al. ................. | 705/7.13 |
| 7,386,535 | B1 * | 6/2008 | Kalucha et al. ...................... | 1/1 |
| 7,810,067 | B2 * | 10/2010 | Kaelicke et al. .............. | 717/102 |
| 2001/0001864 | A1 * | 5/2001 | Page et al. .................... | 709/205 |
| 2002/0065701 | A1 * | 5/2002 | Kim et al. ......................... | 705/9 |
| 2002/0082950 | A1 * | 6/2002 | Anderson et al. ............... | 705/27 |
| 2002/0111824 | A1 * | 8/2002 | Grainger ......................... | 705/1 |
| 2002/0184246 | A1 * | 12/2002 | Shkolnik ........................ | 707/203 |
| 2004/0172320 | A1 * | 9/2004 | Spellman et al. .................. | 705/8 |
| 2005/0159968 | A1 * | 7/2005 | Cozzolino ........................ | 705/1 |
| 2007/0006152 | A1 * | 1/2007 | Ahmed et al. ................ | 717/122 |
| 2007/0198317 | A1 * | 8/2007 | Hartcryde et al. .............. | 705/8 |
| 2007/0233545 | A1 * | 10/2007 | Cala et al. ......................... | 705/9 |

OTHER PUBLICATIONS

Parade update sports a matrix charting feature Hammett, Jim. InfoWorld. San Mateo: May 3, 1993. vol. 15, Iss. 18; p. 24, 1 pgs.*
Parade update sports a matrix feature Hammett, Jim; InfoWorld; San Mateo (May 3, 1993); vol. 15, Iss. 18; p. 24.

* cited by examiner

*Primary Examiner* — William Rankins
(74) *Attorney, Agent, or Firm* — Finnegan Henderson Farabow Garrett & Dunner, LLP

(57) ABSTRACT

A system and methods for managing dynamic teams and workflows is disclosed. In one embodiment, the system and methods include processes for dynamically creating and modifying a team-based workflow. In one instance, the system and methods may include processes for defining a plurality of generic roles, assigning participants to the team, defining focus items, associating the focus items with the plurality of generic roles, and assigning each of the participants at least one of the plurality of generic roles. Additionally, the system and methods may include processes that manage workflows by providing interactive prompts that provide information to direct participants to perform certain actions and providing mechanisms to communicate responses to the interactive responses to other participants based on their assigned generic roles.

11 Claims, 7 Drawing Sheets

| TASKS | Frank | Joe | Rob | Soke | Brian | Ron |
|---|---|---|---|---|---|---|
| Marketing Requirements | I | R | A | | C | |
| Bill of Materials (BOM) | A | R | C | | | I |
| Design Review(s) | | I | | C | A | R |
| Prototype Builds | R | A | | I | | C |
| Production Drawing & Spec. | | C | I | A | R | |
| Facilities, Equipment, Tools | A | | R | | I | C |
| Mftg. Process Flow Chart | C | | I | R | | A |
| Production Ramp-up Plan | | A | | C | I | R |

SYSTEM AND METHODS FOR MANAGING DYNAMIC TEAMS

CROSS-REFERENCE TO RELATED APPLICATIONS

This application is a continuation-in-part of application Ser. No. 11/875,639, filed Oct. 19, 2007, now U.S. Pat. No. 8,195,488 which claims the benefit of U.S. provisional application No. 60/862,387, filed Oct. 20, 2006, the entire contents of which are hereby incorporated herein by reference.

BACKGROUND OF THE INVENTION

1. Field of the Invention

The present embodiments relate to team management and, more particularly, to a system and method using generic roles to dynamically create and modify a team-based workflow.

2. Description of Related Art

To compete in highly dynamic domestic and global markets, organizations are increasingly relying on teams to manage their various workflows. The term workflow as used herein includes tasks, procedural steps, organizations or people involved, required input and output information, and tools needed for each step in a business process. Teams such as cross-functional project teams, multi-party program teams, integrated product development teams, and autonomous work teams are relied upon to collaborate and make timely workflow decisions.

Typically, team managers (e.g., program managers) assemble teams, and assign roles and task responsibilities for the workflows. However, the nature and structure of teams are changing to improve organizational agility and effectiveness. Teams can come together and dissolve more swiftly, membership can frequently expand and contract depending on the needs of the workflow, and roles and responsibilities between team members are more regularly swapped as requirements for their talents and skills change.

This constantly changing team environment requires greater flexibility in managing and maintaining team membership, member roles, responsibility assignments, and communication links between team members; as well as an efficient process for decision making.

Conventional systems for team management generally fall into two categories: project management and collaborative management (i.e., groupware). Project management systems primarily schedule, track, and chart the steps in a project as it is being completed. Collaborative management systems facilitate and manage group activities typically by providing scheduling, document sharing, and e-mail capabilities.

These conventional systems not only lack the flexibility that teams require to make frequent changes to membership, roles and responsibilities, communication links, and workflow, but also fail to provide an efficient process for team-based decision making. As a result, conventional systems hinder team adaptability and productivity. Thus, conventional systems do not meet the team management challenges and needs faced by today's organizations.

In both large and small organizations, the division between 'responsibility' and 'accountability' is often not clear. Many organizations avoid innumerable conflicts by taking the time to make deliberate choices about who will be responsible and accountable for what. A number of organizations use a conventional Responsibility Assignment Matrix (RAM) to clarify those choices.

The conventional RAM is a two-dimensional chart that maps role and responsibility for specific assignments to individuals within an organization. Typically, the RAM is illustrated using a spreadsheet with rows and columns that list team members or departments along one axis, tasks along another axis, and at the intersection of the rows and columns are assigned roles. FIG. 1 illustrates a conventional RAM, showing tasks 2 listed down the leftmost column, team participants 4 across the top row, and intersecting cells showing role assignments 6.

The role assignment placed at the intersecting row and column cell on the matrix indicates a particular role (e.g., Approver) and maps team members to their task assignments. In practice, the conventional RAM uses acronyms such as PARIS (i.e., participant, accountable, reviewer, input, sign-off) to represent the different roles involved. Another example, the acronym RACI (i.e., responsible, accountable, consulted, informed), assigns roles by applying an R, A, C, or I to the cells of a matrix that intersect a 'task' row with a corresponding 'participant' column.

Each task is assigned one 'accountable' individual, one 'responsible' individual, and others who will be 'consulted' or kept 'informed' concerning the task. The RAM is a simple mapping tool for achieving team alignment and a common understanding of who does what. In the example of FIG. 1, Joe has been assigned the role of 'R' (responsible) for marketing requirements.

In view of the above, there exists a need for a system and method that can dynamically create and modify a team-based workflow in response to changes in the team and business environment.

SUMMARY OF THE INVENTION

The preferred embodiments of the present system and methods for managing dynamic teams have several features, no single one of which is solely responsible for their desirable attributes. Without limiting the scope of the present embodiments as expressed by the claims that follow, their more prominent features will now be discussed briefly.

One embodiment of the present methods for managing dynamic teams comprises assigning participants to a team, defining a plurality of generic roles for the participants, defining a plurality of focus items, associating the focus items with the generic roles, and assigning each of the participants at least one of the generic roles.

One embodiment of the present system for managing dynamic teams comprises a participant module for assigning participants to a team, a focus item module for defining focus items for the team, a role assignment module for assigning role assignments to the participants and associating the focus items with the role assignments, and a generic role module for providing generic role definitions to the role assignment module.

Another embodiment of the present methods for managing dynamic teams comprises computer-executable process steps stored on a computer-readable medium. The process steps are configured to dynamically create and modify a team-based workflow. The process steps are executable to perform a method comprising: assigning participants to a team, defining a plurality of generic roles for the participants, defining a plurality of focus items, associating the focus items with the generic roles, and assigning each of the participants at least one of the generic roles.

This brief summary has been provided so that the nature of the present embodiments may be understood quickly. A more complete understanding of the present embodiments can be obtained by reference to the following detailed description of the preferred embodiments in connection with the attached drawings.

BRIEF DESCRIPTION OF THE DRAWINGS

The preferred embodiments of the present system and methods for managing dynamic teams will now be discussed in detail with an emphasis on highlighting the advantageous features. These embodiments depict the novel and non-obvious system and methods shown in the accompanying drawings, which are for illustrative purposes only. These drawings include the following figures, in which like numerals indicate like parts.

DETAILED DESCRIPTION OF THE PREFERRED EMBODIMENTS

The present embodiments provide a system and methods using generic roles to dynamically create and modify a team-based workflow. The system can be implemented in software and executed by a computing system. To facilitate an understanding of the present embodiments, the general architecture and operation of a computing system will be described first. The specific processes under the present embodiments will then be described with reference to the general architecture.

Computing System

Figure 2:
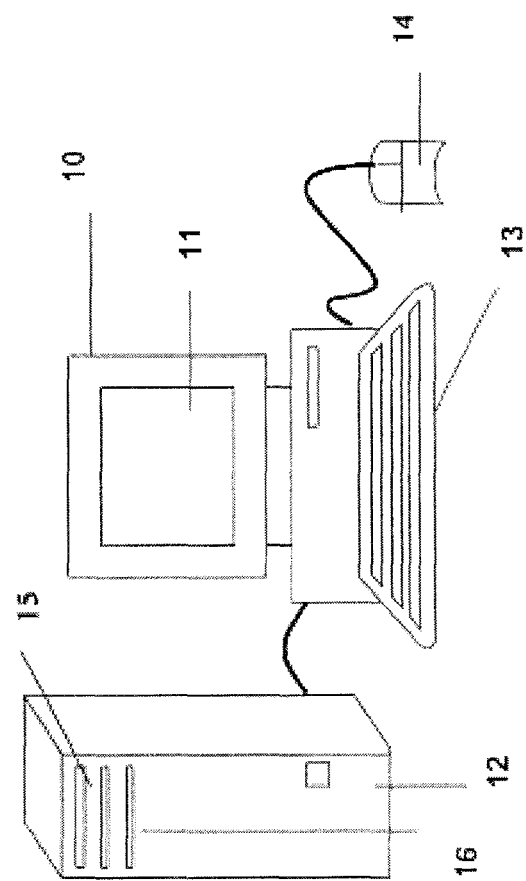
FIG. 2 shows a block diagram of a computing system for executing process steps, according to one aspect of the present embodiments.

FIG. 2 is a block diagram of a computing system for executing computer executable process steps according to one aspect of the present embodiments. FIG. 2 includes a host computing device 10 and a monitor 11. Monitor 11 may be a LCD type, or any other type of color or monochrome display.

Input devices provided with computing device 10 can include a keyboard 13 for entering data and user commands, and a pointing device (for example, a mouse) 14 for processing objects displayed on monitor 11.

Computing device 10 includes a computer-readable memory storage device 15 for storing readable data. Besides other programs, storage device 15 can store application programs including web browsers and computer executable code, according to the present embodiments.

According to one aspect of the present embodiments, computing device 10 can also access computer-readable storage devices storing data files, application program files, and computer executable process steps embodying the present embodiments or the like via an attached or a portable storage device 16 (for example, a DVD-ROM, mobile phone, flash memory device, tape drives and the like).

A network interface device (i.e. modem), a communications service provider (i.e. ISP, voice carrier), or the like also provide computing device 10 with a network connection 12 to the public Internet, a virtual private network/hub or an intranet. Network connection 12 allows computing device 10 to download data and executable program files, and run computer-executable process steps embodying the present embodiments.

The present embodiments are not limited to the FIG. 2 architecture. For example, a network connected computing device (i.e. server) accessible via a network connection and a network interfacing device (i.e. mobile phone), or any other interfacing system capable of connecting to a network and running computer-executable process steps, as described below, on/from that network connected computing device or cluster of network connected computing devices (e.g. grid of connected servers) may be used to implement the various aspects of the present embodiments.

Figure 3:
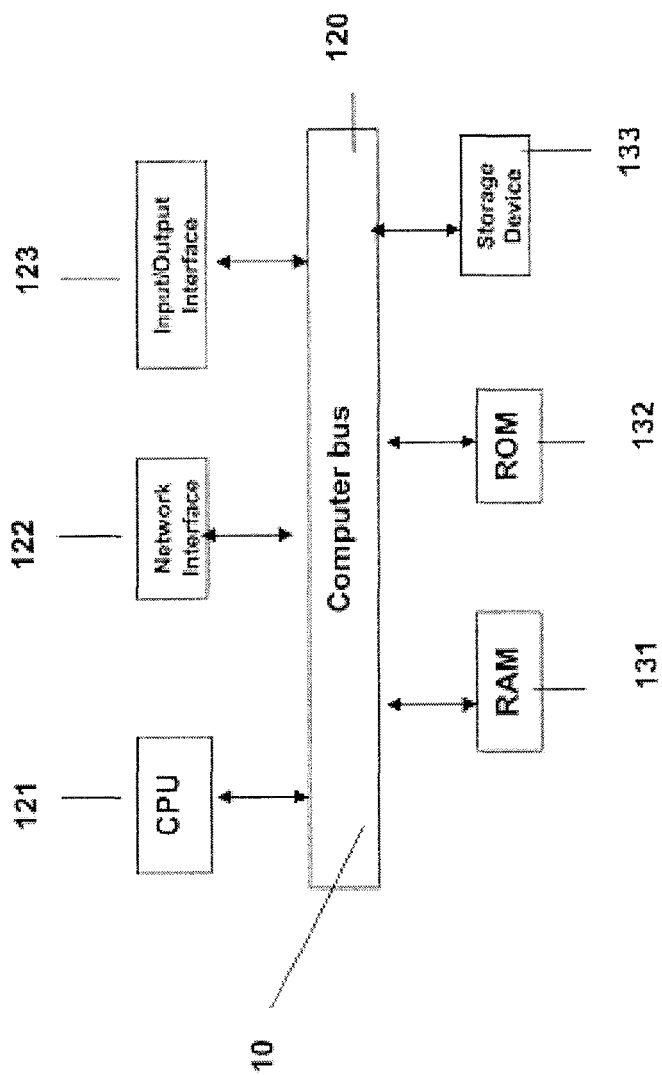
FIG. 3 shows the internal architecture of the computing system of FIG. 2.

FIG. 3 shows a top-level block diagram showing the internal functional architecture of computing device 10 that may be used to execute the computer-executable process steps, according to one aspect of the present embodiments. As shown in FIG. 3, computing device 10 includes a central processing unit (CPU) 121 for executing computer-executable process steps and interfaces with a computer bus 120.

Also shown in FIG. 3 are an input/output interface 123 that operatively connects output display devices such as monitors 11, input devices such as keyboards 13 and pointing devices such as a mouse 14.

A storage device 133 (similar to device 15) also interfaces to computing device 10 through computer bus 120. Storage device 133 may be disks, tapes, drums, integrated circuits, or the like, operative to hold data by any means, including magnetically, electrically, optically, and the like. Storage device 133 stores operating system program files, application program files, computer-executable process steps of the present embodiments, web-browsers and other files. Some of these files are stored on storage device 133 using an installation program. For example, CPU 121 executes computer-executable process steps of an installation program so that CPU 121 can properly execute the application program.

Random access memory 131 also interfaces with computer bus 120 to provide CPU 121 with access to memory storage. When executing stored computer-executable process steps from storage device 133, CPU 121 stores and executes the process steps out of random access memory 131.

Read only memory ("ROM") 132 is provided to store invariant instruction sequences such as start-up instruction sequences or basic input/output operating system (BIOS) sequences.

Computing device 10 can be connected to other computing systems through network interface 122 using computer bus 120 and a network connection. Network interface 122 may be adapted to one or more of a wide variety of networks, including local area networks, storage area networks, wide area networks, the Internet, and the like.

In one aspect of the present embodiments, software for dynamically creating and modifying a team-based workflow may be supplied on a storage device, such as a CD-ROM or a floppy disk, or alternatively could be read and operated from the network via a network interface 122. In yet another aspect of the present embodiments, computing device 10 can load the software for dynamically creating and modifying a team-based workflow from other computer readable media such as magnetic tape, a ROM, integrated circuit, or a magneto-optical disk.

Alternatively, the software for dynamically creating and modifying a team-based workflow is installed onto storage device 133 of computing device 10 using an installation program and is executed using the CPU 121.

In yet another aspect, the software for dynamically creating and modifying a team-based workflow may be implemented by using an Application Specific Integrated Circuit that interfaces with computing device 10.

The constantly changing team environment of organizations requires greater flexibility in managing and maintaining team membership, member roles, responsibility assignments, and communication links between team members; as well as an efficient process for decision making. For example, new team initiatives inevitably will require some job shifting. Some people will have to stop what they have been doing and take on different responsibilities; some may be required to add new responsibilities onto an already crowded slate. Similarly, new initiatives can frequently involve rapid adjustments that require team-based decision making.

To overcome the problems with prior systems as described above, the present embodiments simplify communications in a team by creating generic roles for team members, or team participants. A generic role is a communication shortcut that clusters commonly understood responsibilities and parameters that are not specifically tied to a participant's function, discipline, organizational structure, or skill set. The responsibilities and parameters are thus generic to any participant.

Using generic roles allow the role of each participant to be easily conveyed or understood. Moreover, by using generic roles, the present embodiments simplify the interchanging and movement of team members in and out of teams. Furthermore, since participants are not tied to job title, discipline, organizational structure, etc., team flexibility increases as participants can assume any needed generic role. Although the system and method of the present embodiments are described using four generic roles, those skilled in the art will recognize that more than or less than four generic roles may be used.

In one example of the present embodiments, the four generic roles are represented by the acronym RACI (i.e., responsible, accountable, consulted, informed). However, alternative acronyms, icons, foreign language characters, or other symbols can be used to represent the generic roles.

The first generic role, represented by 'R', embodies the responsibilities of the doer, the responsible participant, the responder, the lead, the worker, or the implementer of the assigned action or task. The second generic role, represented by 'A', embodies the responsibilities of the approver, the authority, the accountable, or the participant of the team who signs-off on the assigned action or task. The third generic role, represented by 'C', embodies the responsibilities of the contributor, the consulted, the collaborator, the commentator, the recommender, the adviser, the reviewer, or the supporter of the assigned action or task. The fourth generic role, represented by 'I', embodies the responsibilities of the informed, the updated, the notified, or the monitor of the assigned action or task. By using four generic roles, a dramatic simplification of role management is gained.

The roles intuitively convey an 'action to be performed'. By using acronyms, the action to be performed for each generic role is easily understood. The participant assigned to the 'R' role is required to respond and perform the action or accomplish the task. The participant assigned to the 'A' role is required to approve or sign-off (rejection and rework is implied) on the action or task in the workflow. The participant assigned to the 'C' role is required to contribute to or assist with the responsibilities of the participant assigned the 'R' role. The participant assigned to the 'I' role is not required to perform any workflow actions or tasks but is required to stay informed of the progress of the workflow. Each participant is responsible for their assigned actions or tasks and to act according to their assigned role.

Figures 1, 4:
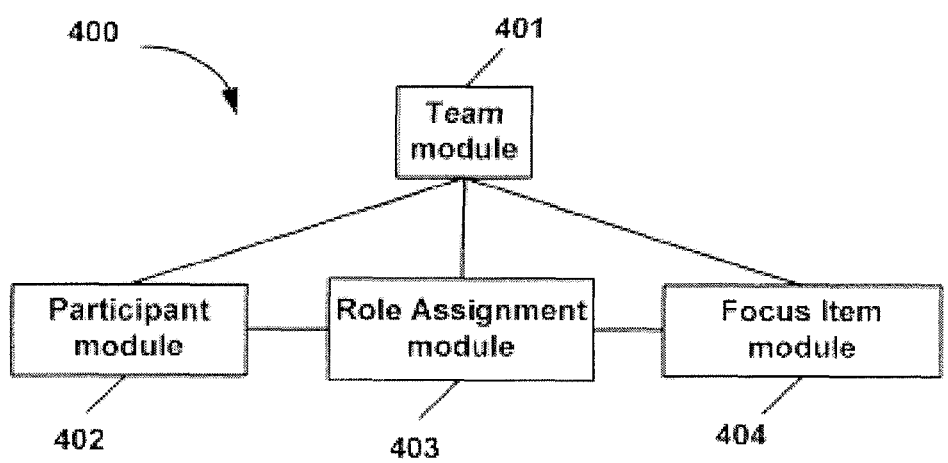
FIG. 1 is one example of a conventional responsibility assignment matrix (RAM)
FIG. 4 illustrates a block diagram of a system for dynamically creating and modifying a team-based workflow using generic roles, according to one aspect of the present embodiments.

Turning to FIG. 4, a block diagram of a system 400 for dynamically creating a team-based workflow using generic roles is shown. In system 400, a team module 401 creates, manages and maintains the teams and is linked to a participant module 402, a role assignment module 403 and a focus item module 404. The linking of modules 401, 402, 403, and 404 creates a team-based workflow that uses generic roles.

Participant module 402 assigns participants to the team, role assignment module 403 assigns role assignments to the participants on the team and focus item module 404 defines focus items (i.e. actions or tasks) for the team to accomplish. A role assignment does not directly assign a focus item to a particular participant. Instead, participants are assigned focus items as a result of receiving a role assignment. In other words, role assignments communicate and activate focus item responsibility for corresponding participants of the team.

Participant module 402 also manages and maintains participant assignments and definitions for each team. Participant definitions are not limited to defining individuals, and may, for example, define groups, departments, subsidiaries, or companies. Each team can have an unlimited number of participants.

Role assignment module 403 manages and maintains the role assignments and the connections between participant 402 and focus item 404 modules for each team. In one embodiment, role assignments for the team are made by applying the generic roles 'A', 'C', or 'I' to the cells of a matrix that intersect a 'focus item' row with a corresponding 'participant' column. By using the role assignment to connect a focus item to a team participant in a matrix layout, responsibility is explicitly understood, and role and responsibility confusion eliminated. Thus, team participants explicitly understand each others' actions to be performed' and focus item responsibilities.

In one embodiment, only one 'A' role can be assigned for each focus item. Similarly, only one 'R' role can be assigned for each focus item. However, multiple 'C' role and 'I' role assignments are permitted for each focus item. Unlike prior systems and methods, participants, focus items, and role assignments are dynamic and can be changed at any time.

Focus item module 404 manages and maintains the focus item definitions and data for each team. A focus item defines actions, items, objectives, data, assets, projects, databases, software applications, functions, categories, resources, activities, services, deliverables, or processes; where responsibility for, or management of can be delegated or assigned.

By utilizing the modules described above, changes to participants, role assignments, or focus items are simple as the workflow adjusts dynamically. It is easy to create and dissolve teams by adding or removing role assignments. Furthermore, participants can participate on numerous teams, each with different roles and focus item responsibility assignments, and yet have different communication workflows for each focus item and team. This allows for simple participant interchanging between teams.

A participant can have an unlimited number of assigned roles. However, for each assigned role there is a corresponding unique focus item. A participant's assigned roles are independent of each other. Roles may be assigned to or removed from participants at any time, which provides a very flexible and dynamic method of team management.

Figure 5:
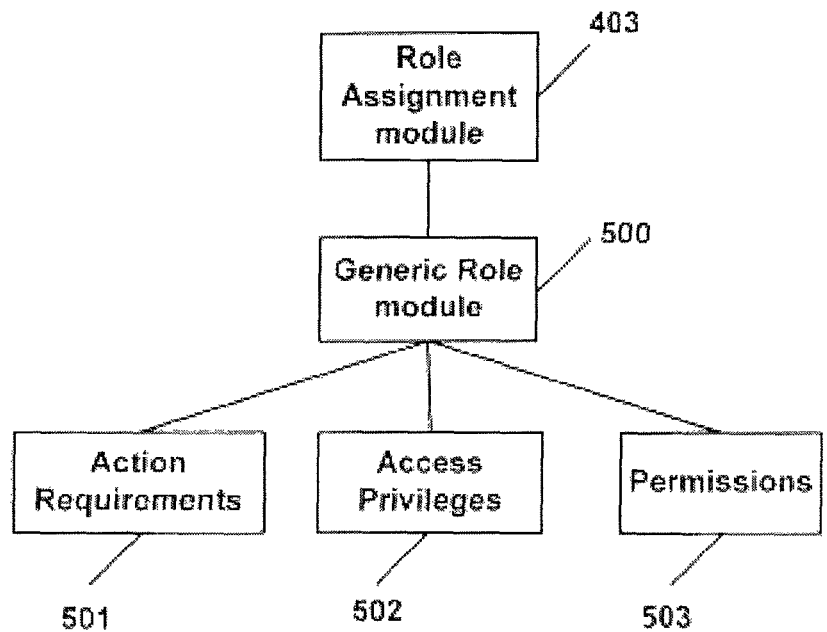
FIG. 5 illustrates a block diagram of a system for defining a generic role in a workflow, according to one aspect of the present embodiments.

FIG. 5 illustrates a block diagram of a system for defining a generic role in a workflow. In assigning roles to participants, a generic role module 500 communicates with role assignment module 403 and manages and maintains role data that defines the generic roles for each team. The four generic roles, RACI, can also be described as "who does what", "who is accountable for what", "who contributes" and "who stays informed" (action requirements) as well as access privileges and permissions to perform operations. Using generic role assignments to connect a participant to a focus item easily creates a workflow as role assignments activate a workflow.

An action requirements module 501 manages and maintains different action requirement definitions for each generic role and provides the action requirement definition to generic role module 500. Team participation involves four distinct action responsibilities which form the basis of four generic roles represented by the acronym RACI.

An access privileges module 502 manages and maintains access authorization definitions for each generic role and provides the authorization definitions to generic role module 500. Each of the four generic roles indicates a level of access privilege according to defined business rules within an access privilege module 502. For example, access privileges may define the ability to access certain databases on a network, design schematics, cost information, scheduling, or customer information, where the 'A' and 'R' roles receive full access privileges while 'C' and T roles receive a subset of design and cost information access.

By utilizing generic roles, changes to a participant's access privilege can be made dynamically; as privilege is based on the participant's role, the access privilege definition within that participant's particular team and focus item definition. As the system and method of the present embodiments occurs in real time, focus item and roles assignment can change dynamically, thus so can privilege.

A permissions module 503 manages and maintains the different permission definitions for each role and provides the definitions to generic role module 500. Permissions define authorized interactions or permitted operations. For example, permissions may define the ability to edit a design specification, open a network access port, or cancel an order.

Information is collected from generic role module 500 by role assignment module 403. This information includes definitions for each role's action requirements, access privileges, and permissions. Generic role module 500 provides updated action requirements, access privileges, and permission definitions to role assignment module 403 independent of participant identity. The generic role definitions can be changed independently of participant assignments, and independently of each definition component associated with a given generic role.

Process Flow

Figure 6:
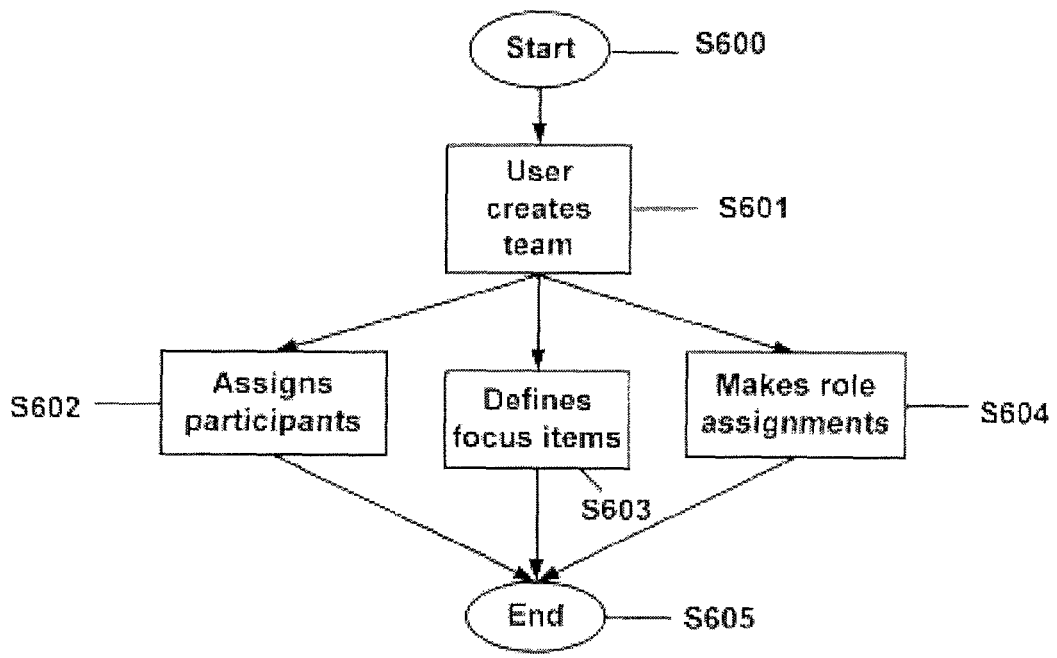
FIG. 6 is a flow diagram illustrating the steps of a method for creating and managing a team, according to one aspect of the present embodiments.

FIG. 6 is a flow diagram illustrating a method for creating and managing a team-based workflow. The process starts in step S600 when a user (e.g. team manager) decides to create a team. In step S601, the user creates a team by assigning participants to a team in step S602, defining focus items in step S603 and assigning role assignments to participants in step S604. After receiving a role assignment, the focus item corresponding to the role assignment is assigned to the participant. After the completion of step S601, steps S602, S603, and S604 can occur in any order. Furthermore, the workflow dynamically aligns and adjusts to changes in participant assignment, role assignment, or assigned focus item resulting in an up to date team. Once the team has been created, the process is ended until a change is required S605.

Figure 7:
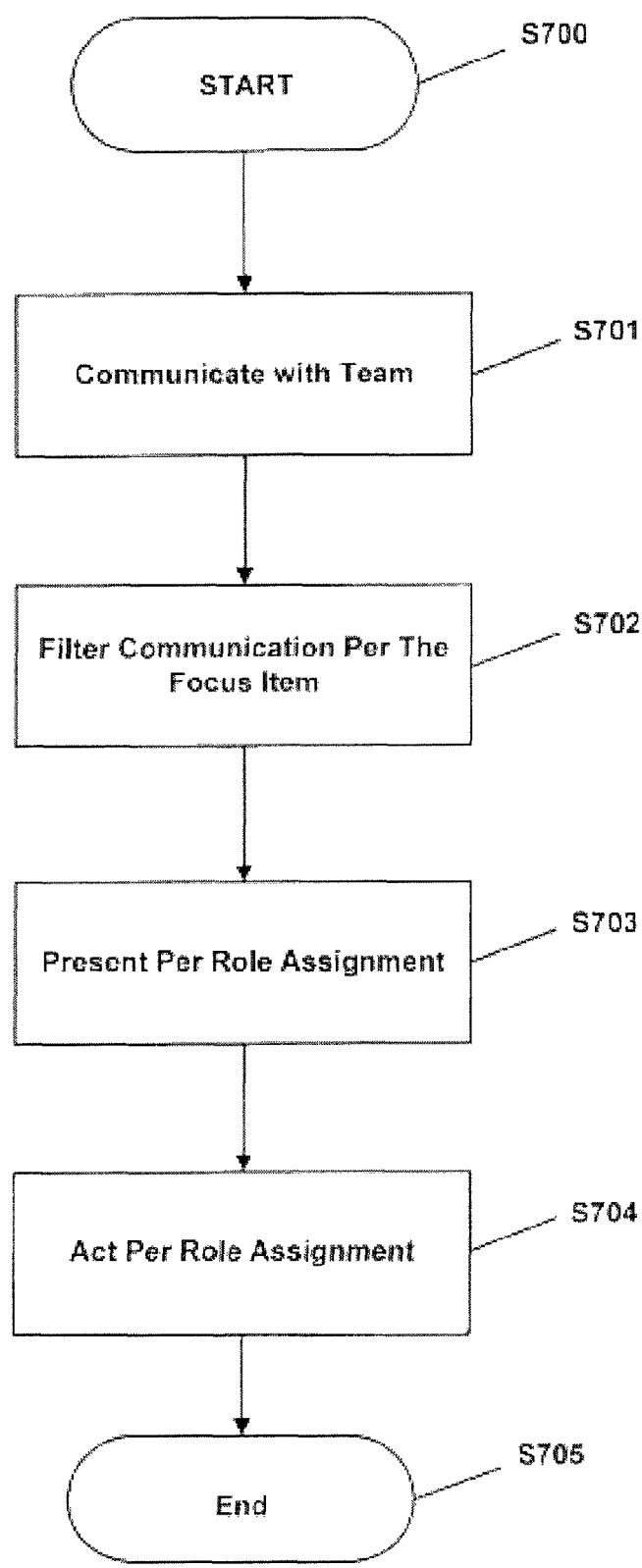
FIG. 7 is a flow diagram illustrating the steps of a process for using generic role assignments in a team-based workflow.

Turning to FIG. 7, a flow diagram illustrating a process for using generic role assignments in a team-based workflow is shown. The process starts in step S700 and in step S701 a request or message is communicated to the team. In step S702, the communication is filtered per the focus item so only participants assigned roles associated with the focus item will receive (or have access to) the communication. Once it has been determined which participants will access/receive the communication, the request or message information is presented to each participant in accordance to their role assignment for the associated focus item in step S703. Requests include, but are not limited to, requests for information, proposals, price quotes, engineering changes, preventive actions, purchase orders, and the like. Messages include, but are not limited to, notifications, issues, comments, suggestions, recommendations, etc., as well as machine-readable messages such as RFID, EDI code, and the like.

In S704, as discussed above, participants assigned to an 'I' role have no action responsibility within the workflow. Those participants assigned to a 'C' role have the responsibility to contribute to the 'R' role assigned efforts. The participant assigned the 'R' role has the responsibility to respond to the request, perform the work and send/submit to the participant assigned the 'A' role for approval. Once approved, the response to the request is completed in step S705.

Not all communications require action. For example, an acknowledgement, an update, or advanced activity notice do not require action.

By coupling the action requirements, access privilege, and permissions into four generic roles rather than position/title specific roles, role maintenance is greatly reduced. Thus, one simple assignment communicates required actions to be performed, access privileges, and interactions permitted, and activates messaging associated with a specific focus item. For example, to change the focus item responsibilities for a given participant, the participant is simply unassigned or reassigned to a different role using step S604 in FIG. 6, thus the team can change dynamically whereas in conventional systems, additional roles or a new team would have to be created, assigned, and maintained.

In the present embodiments, messages/requests are not sent (or presented) to a unique participant, but are sent to a team-based on focus items. All participants assigned a role associated with that focus item access/receive the information in accordance to their role. Communications are team and focus item specific, thus mitigating the problem of figuring out who should receive a message/request. By sending the messages to the team regarding a focus item, message senders do not need to keep track of the team participant changes nor their roles and responsibility changes. Message senders are assured that the right participants will access/receive their message.

The present embodiments could be used in the creation of a product. Any design changes to the product are communicated to all the participants responsible for design. First, a request to change a part in the design is communicated to the team which then filters the communication per the focus item to determine which participants of the team should receive the request. Team participants that are assigned an "I" do nothing, team participants assigned a "C" must contribute assistance to the "R." "R" then submits the response to "A" and "A" approves it. Thus, communications and decision making involve all participants with assigned roles to the focus item, facilitating team-based decision making.

Access authorization is based on coupling a requesting participant's assignment to the team, the role assignment for that focus item, and the access privilege defined for the assigned generic role.

Figure 8:
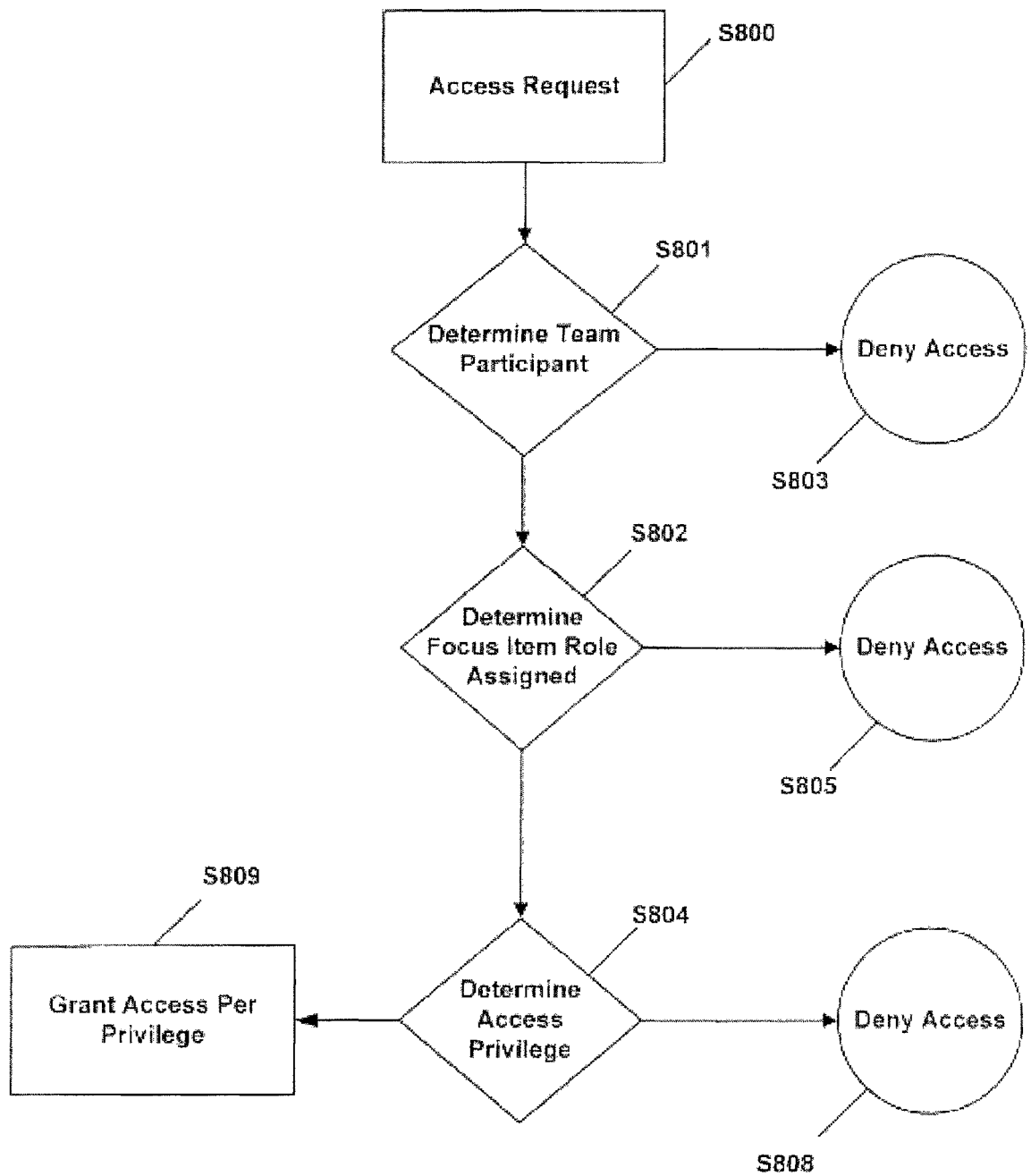
FIG. 8 is a flow diagram illustrating the steps of a method for accessing protected content of a team.

FIG. 8 is a flow diagram illustrating the steps of a method for accessing protected content. The process starts in step S800, when a participant requests authorization to access protected content. In step S801, the user provides an identifier or ID (e.g. credential) to verify that the participant is assigned to the team. If the participant is not assigned to the team, as determined by participant module 402 (see FIG. 4), the participant is immediately denied access in step S803.

If the participant has been assigned to the team, in step S802 the requester's participant ID is used to verify a corresponding role assignment to the focus item for which content access is requested. Role assignment module 403 (see FIG. 4) maintains role assignment data used for verifying the participant's role assignment for that focus item. If the participant does not have a role assignment for that focus item in step S805, access is denied.

The role assigned to the requesting participant for that focus item specifies a level of access privilege. Generic role module 500 (see FIG. 5) maintains role access privilege data and determines in step S804, if the participant has the appropriate privilege. If the assigned role definition does not include access privileges for the requested focus item content, then in step S808 access will be denied. If the assigned role definition includes access privileges, then in step S809, the requester will be granted access to the requested focus item content.

The present embodiments allow for the creation of team-based workflows using generic roles. Creating generic roles allow for the team to dynamically change as the needs and environment of the team and business change.

Scope of the Invention

The above description presents the best mode contemplated for carrying out the present system and methods for managing dynamic teams, and of the manner and process of practicing them, in such full, clear, concise, and exact terms as to enable any person skilled in the art to which they pertain to practice this system and these methods. This system and these methods are, however, susceptible to modifications and alternate constructions from those discussed above that are fully equivalent. Consequently, this system and these methods are not limited to the particular embodiments disclosed. On the contrary, this system and these methods cover all modifications and alternate constructions coming within the spirit and scope of the system and methods as generally expressed by the following claims, which particularly point out and distinctly claim the subject matter of the system and methods.

Additional Embodiments

Aspects of the disclosed embodiments provide a computer system for managing workflows in accordance with the features disclosed above. In addition, the system may be configured to provide interactive prompts that inform participants of a team of actions to be performed relating to their assigned roles. For example, in one embodiment, a computer system (e.g., the system described above in connection with FIG. 2) may be provided that includes a memory storing computer-executable code relating to managing workflows and a processor that executes the computer-executable code to perform a workflow management process.

Figure 9:
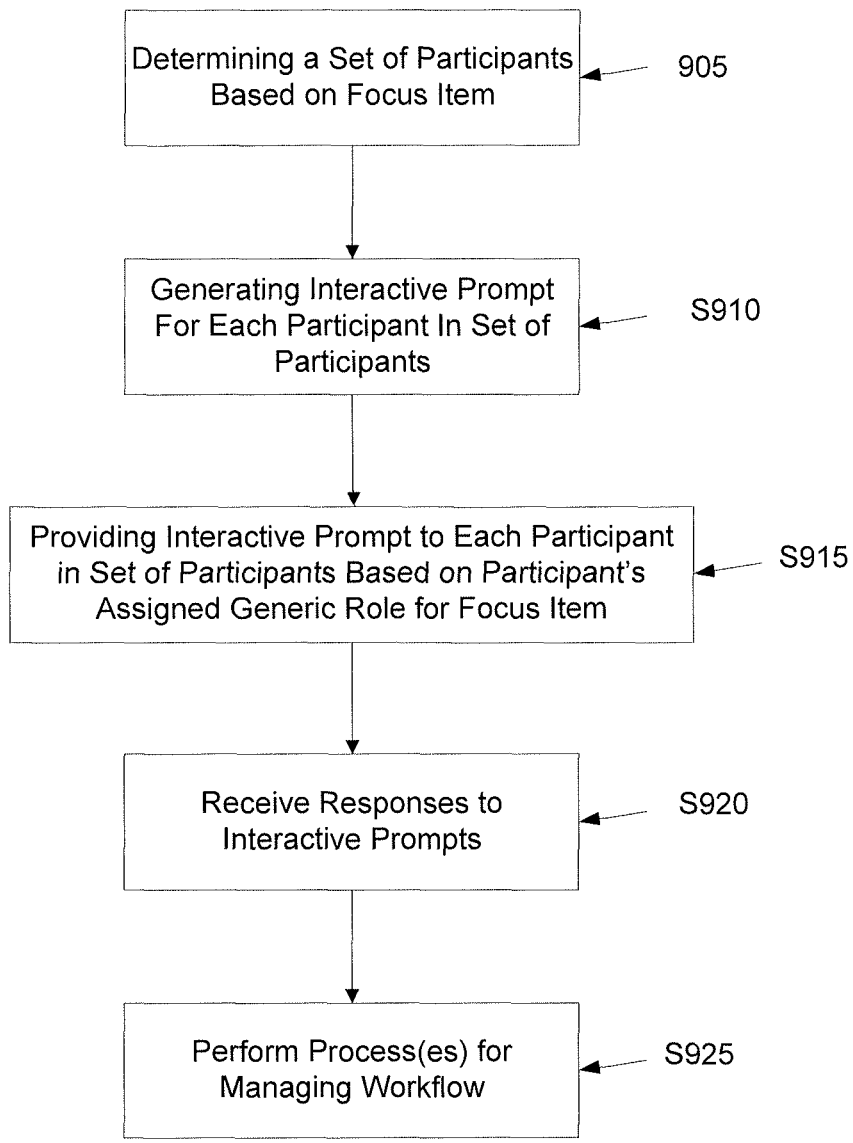
FIG. 9 is a flow diagram showing an exemplary workflow management process consistent with disclosed embodiments.

FIG. 9 shows an exemplary workflow management process that may be executed by a computer system (e.g., FIG. 2) consistent with the disclosed embodiments. The workflow management process may include, for example, determining from a group of participants included in a team, a first set of participants based on a first focus item such that participants assigned generic roles associated with the first focus item are included in the first set of participants (e.g., Step S905). In one aspect, only participants assigned generic roles associated with the first focus item may be included in the first set of participants. The process may also include generating, for each participant in the first set of participants based on the first focus item, an interactive prompt relating to the respective participant's assigned generic role, such that the interactive prompt includes information reflecting required actions to be performed by the participant (e.g., Step S910). In one embodiment, the interactive prompt may include requests to perform certain tasks (e.g., perform work, etc.), approve (or reject) the tasks (e.g., approve the work), contribute to the completion of the task(s) (e.g., provide input or analysis relating to the work), and stay informed of the task(s) (e.g., maintain awareness of the status of work progress). The process may also include providing to the participants the interactive prompts relating to their assigned generic role, such that the interactive prompts request and wait for the participant's response (e.g. an acknowledgment or estimated completion time).

In one embodiment, the system may be configured to provide one or more interactive prompts for each participant in accordance with the participant's assigned generic role for a focus item. Generic role assignments may include an 'R' role, reflecting a participant responsible to perform a task or work, and 'A' role, reflecting a participant accountable for approving the task or work, a 'C' role, reflecting a participant that contributes to the completion of the task or work, and an 'I' role, reflecting a participant that stays informed of the focus item work progress. In certain aspects, the workflow management process may also include generating, for each participant with an 'R' role assignment an interactive prompt requesting submission of completed work. The workflow management process may also include, upon receiving from a participant having an 'R' role a submission of the completed task or work for approval, generating for one or more participants with the 'A' role assignment, an interactive prompt requesting approval of the submitted task or work for the focus item. In one embodiment, the generic role assignments for a set of participants include an 'R' role and an 'A' role and the interactive prompt for the 'R' role assignment may be different from the interactive prompt for the 'A' role assignment.

In certain embodiments, interactive prompts may include information generated and provided by the computer system to respective participants via the participant's computer system (e.g., via a display device connected to a computer executing software). For instance, aspects of the disclosed embodiments include a computer system connected via a wireless or wired network (e.g., Internet, local area network, etc.) to one or more computer systems associated with participants. In one aspect, the computer system of FIG. 2 may be a server computer system that generates information accessible by participants over a network, such as the Internet. The server computer system may send messages, notifications, and interactive prompts to one or more participants directly to the participants' computer systems via the network. Alternatively, or in addition, the server computer system may receive requests to access information from the participants (via their respective computer systems), and in response to the requests, the server computer system may send information (e.g., task/work prompts, etc.) to the participants.

In certain embodiments, the workflow management processes described above may be performed in a wireless or wired network environment where smart devices (e.g., smart phones, handheld devices, tablet computers, etc.) interface and communicate with the computer system executing the workflow management processes described herein. For example, participants in a first set of participants may use a smart phone to receive notification prompts from the computer system executing the workflow management processes of the disclosed embodiments. Disclosed embodiments further include the use of Web server technologies to provide a Web page or similar content hosting environment where participants have access to interactive prompts, messages, communications, etc. from the computer system executing the disclosed workflow management processes. Disclosed embodiments may also implement social media platforms to provide communications of tasks, actions, messages, etc. to provide workflow management in accordance with the disclosed embodiments. For instance, the computer system executing the disclosed workflow management processes may be configured to automatically generate social media groups that form a secure (or limited access) site on the Internet that is accessible only by participants of a common team. Thus, for example, the computer system may be configured to form a social media group, a private web-based group, or similar mechanism that enables members of the same team to receive messages, view content, and provide information in response to interactive prompts. In certain aspects, the computer system may be configured to customize the messages, interactive prompts, etc. such that participants only receive requests, information, prompts, etc. that include information or requests based on assigned generic roles of the participants. The computer system may be configured to manage the workflow from the team of participants based on responses to the interactive prompts provided by the participants.

Aspects of the disclosed embodiments include processes that are executed by the computer system executing workflow management processes to manage interactive prompts, receive responses from participants (e.g., S915) and provide information to other participants. In one embodiment, the disclosed embodiments may receive a response to an interactive prompt from a participant and generate interactive prompt response information that the system and processes use to generate information that may be provided to other participants. The disclosed embodiments may also execute processes that generate and provide information to one or more other participants of a team, or other entities or individuals based on the interactive prompt response information (e.g., S920). In one embodiment, the exemplary systems and processes may generate additional interactive prompts for the one or more other participants.

In one embodiment, the computer system may also be configured to perform processes for managing the workflow for the team (e.g., S925). Managing the workflow may include providing information and interactive prompts to participants based on assigned roles, role assignment changes, and responses to interactive prompts etc. The computer system may also provide participants access to information relating to the groups, teams, roles, and focus items consistent with those disclosed above. For example, as the workflow management processes executes, participants may be provided interactive prompts directing them to perform certain tasks based on participant's assigned generic role for a given focus item. The disclosed system and processes may receive responses to the interactive prompts by the corresponding participants and perform workflow management processes that identify one or more participants via their generic role (e.g. those with 'C' roles) that should receive information reflecting the responses to the interactive prompts provided to other participants. The system and processes may automatically generate information used to create interactive prompts for subsequent participants based on the received responses. For example, in the case when an 'A' role participant rejects submitted work and makes a recommendation to the 'R' role participant doing the work, the workflow management processes may include generating for the 'R' role participant an interactive prompt requesting a rework of the focus item work and a review of the 'A' role's rework recommendation and generate for those participants with a 'C' role an interactive prompt requesting review of the 'A' role's rework recommendations and to submit input for the completion of the focus item rework.

In another example, a designer participant in a workflow relating to the design of a product may receive an interactive prompt (e.g., via email, email with a hyperlink, web page, text, social media message, etc.) to perform an action based on the designer's assigned generic role for a focus item. The system and processes may receive a response to the interactive prompt by the designer participant, such as information reflecting a design change that requires approval. The disclosed systems and processes may determine based on the designer's response one or more other participants via their generic roles that should receive an interactive prompt, such as a supervisor by way of an assigned 'A' role. The disclosed systems and processes may, in one example, generate information to create the supervisor's interactive prompt (e.g., request approval of the design change), and provides the interactive prompt to the supervisor (e.g., via email, email with a hyperlink, web page, social media message, text, etc.). The system and processes may receive a response from the supervisor participant and perform additional workflow management processes based on the response, such as identifying other participants via their generic roles that should receive information relating to the response, generating additional interactive prompts, etc. The automated system may be configured not to rely on the person's job title, instead it may use the assignment of generic roles to identify and administer interactive prompts and responses to those interactive prompts, etc. to the appropriate participants.

Accordingly, in certain embodiments, the disclosed systems and methods provide processes that, when executed by a processor, computer, etc., manage workflows by providing interactive prompts that provide information to direct participants to perform certain actions, provide an interactive prompt mechanism allowing the participant to respond (e.g. acknowledge, accept, estimate a completion or delivery date, etc.) and mechanisms to communicate responses to the interactive responses to other participants based on their assigned generic roles.

Other configurations of the disclosed embodiments may be implemented without departing from the scope of the disclosed embodiments. For example, aspects of the disclosed embodiments may be implemented using many types of computer system environments and using known software programming methodologies and languages.

What is claimed is:

1. A computer-implemented method for dynamically creating and modifying a team-based workflow, comprising:
   assigning, by a computer system, participants to a team;
   receiving, by the computer system, information defining generic roles for the participants;

defining, by the computer system, a plurality of focus items;

assigning, by the computer system, participants to one or more of the generic roles;

associating, by the computer system in response to the assigning participants to one or more generic roles, the focus items with the generic role assignments such that for each assigned generic role there is a corresponding unique focus item;

creating, by the computer system, a workflow that presents messages related to a focus item to participants with a role assignment for the focus item; and automatically modifying, by the computer system, the workflow in response to a received change to one or more generic role assignments for one or more participants of the team.

2. The method of claim 1, wherein automatically modifying the workflow includes:

modifying, by the computer system, the workflow such that a notification relating to a first focus item associated with a first generic role assignment that is to be provided to a first participant of the team is changed to reflect the change in the one or more generic role assignments.

3. The method of claim 1, wherein automatically modifying the workflow includes modifying the assignment of participants to the team based on the change to the one or more generic role assignments.

4. The method of claim 1, further comprising:

receiving, by the computer system, a communication corresponding to a first focus item;

filtering, by the computer system, the communication based upon the first focus item; and presenting, by the computer system, the communication only to the participants assigned generic roles associated with the first focus item, wherein the communication is presented differently to each of the participants based on the participant's assigned generic role.

5. The method of claim 1, further comprising:

receiving, by the computer system, a request for authorization to access protected content relating to a first focus item;

providing, by the computer system, an identifier to verify that a participant is assigned to the team;

verifying, by the computer system, the participant has a role assignment for the first focus item; and granting, by the computer system, access to the protected focus item content if the role assignment includes access privileges or denying access to the protected focus item content if the role assignment does not include access privileges.

6. The method of claim 1, wherein the assigning participants to one or more generic roles includes applying the generic role assignments to a responsibility assignment matrix that associates the one or more generic role assignments to the participants, and wherein modifying the workflow includes:

receiving a change to the responsibility assignment matrix that reflects the change of one or more generic role assignments for one or more participants of the team; and automatically modifying the workflow in response to the change to the one or more generic role assignments in the responsibility assignment matrix.

7. A non-transitory computer-readable storage medium including program instructions that, when executed by a processor, perform a process to dynamically create and modify a team-based workflow, the process comprising:

assigning participants to a team;

defining a plurality of generic roles for the participants; defining a plurality of focus items; assigning participants to one or more of the generic roles; associating, in response to the assigning participants to one or more generic roles, the focus items with the generic role assignments such that for each assigned generic role there is a corresponding unique focus item;

creating a workflow that presents messages related to a focus item to participants with a role assignment for the focus item; and automatically modifying the workflow in response to a received change to one or more generic role assignments for one or more participants of the team.

8. The computer-readable storage medium of claim 7, wherein automatically modifying the workflow includes:

modifying the workflow such that a notification relating to a focus item associated with a first generic role that is to be provided to a first participant of the team is changed to reflect the change in the one or more generic role assignments.

9. The computer-readable medium of claim 7, wherein the process further comprises:

receiving a communication corresponding to a first focus item;

filtering the communication based upon the first focus item; and presenting the communication only to the participants assigned roles associated with the first focus item, such that the communication is presented differently to each of the participants based on the participant's assigned generic roles.

10. A system for managing workflows, comprising:

a memory storing computer-executable code relating to managing workflows; and a processor that executes the computer-executable code to perform a workflow management process, the process including:

determining from a group of participants a first set of participants based on a first focus item such that participants assigned generic roles associated with the first focus item are included in the first set of participants, wherein the generic role assignments include an 'R' role, reflecting a participant responsible to perform work relating to the first focus item, an 'A' role, reflecting a participant accountable for approving the first focus item work, a 'C' role, reflecting a participant that contributes to the completion of the first focus item work, and an 'I' role, reflecting a participant that stays informed of work progress for the first focus item, generating, for each participant in the first set of participants based on the first focus item, an interactive prompt relating to the participant's assigned generic role, the interactive prompt including information reflecting one or more actions to be performed by the participant based on the participant's assigned generic role, wherein the interactive prompts include information reflecting at least one of requests to perform the first focus item work, requests to approve or reject the first focus item work, requests to contribute to the completion of the first focus item work, and requests to stay informed of progress relating to the first focus item work, providing to each participant in the first set of participants, a corresponding interactive prompt based on the participant's assigned generic role for the first focus item, wherein the corresponding interactive prompts for a participant with a first generic role is different than the corresponding interactive prompt for a second participant with a second generic role that is different from the first generic role, receiving responses to the corresponding interactive prompts by one or more of the participants in the first set of participants, and managing the workflow of the first set of participants based on the received responses.

11. The system of claim 10, wherein the workflow management process includes:

generating, for each participant with an 'R' role assignment an interactive prompt requesting performance of the corresponding first focus item work;

generating, for each participant with a 'C' role assignment an interactive prompt requesting contribution to the completion of the first focus item work;

generating, for each participant with an 'R' role assignment an interactive prompt requesting submission of information reflecting the completion of the first focus item work; and generating for a participant with an 'A' role assignment, in response to receiving from one or more participants having an 'R' role the submission of information reflecting the completion of the first focus item work, an interactive prompt requesting approval of the submitted first focus item work.

* * * * *